(12) United States Patent
Nguyen et al.

(10) Patent No.: US 10,308,868 B2
(45) Date of Patent: Jun. 4, 2019

(54) GENERATING AND ENHANCING MICROFRACTURE CONDUCTIVITY

(71) Applicant: Halliburton Energy Services, Inc., Houston, TX (US)

(72) Inventors: Philip D. Nguyen, Houston, TX (US); Ronald G. Dusterhoft, Katy, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 72 days.

(21) Appl. No.: 15/038,058

(22) PCT Filed: Jan. 2, 2014

(86) PCT No.: PCT/US2014/010013
§ 371 (c)(1),
(2) Date: May 20, 2016

(87) PCT Pub. No.: WO2015/102628
PCT Pub. Date: Jul. 9, 2015

(65) Prior Publication Data
US 2016/0304770 A1   Oct. 20, 2016

(51) Int. Cl.
*E21B 43/26* (2006.01)
*E21B 43/267* (2006.01)
(Continued)

(52) U.S. Cl.
CPC .............. *C09K 8/80* (2013.01); *C09K 8/66* (2013.01); *C09K 8/70* (2013.01); *C09K 8/805* (2013.01);
(Continued)

(58) Field of Classification Search
None
See application file for complete search history.

(56) References Cited

U.S. PATENT DOCUMENTS

| 5,007,481 A | 4/1991 | Williams et al. |
| 5,036,919 A | 8/1991 | Thomas et al. |

(Continued)

FOREIGN PATENT DOCUMENTS

| EP | 2527586 A1 | 11/2012 |
| WO | 2007078995 A1 | 7/2007 |
| WO | 2015102628 | 7/2015 |

OTHER PUBLICATIONS

Cipolla et al., "The Relationship Between Fracture Complexity, Reservoir Properties, and Fracture Treatment Design," SPE Annual Technical Conference and Exhibition, Denver, CO., 2008, SPE 115769.
(Continued)

*Primary Examiner* — Angela M DiTrani Leff
*Assistant Examiner* — Charles R Nold
(74) *Attorney, Agent, or Firm* — McGuireWoods LLP

(57) ABSTRACT

Methods comprising: introducing a micro-proppant treatment fluid into a formation at a rate and pressure sufficient to create or enhance at least one fracture in a first treatment interval, wherein the micro-proppant treatment fluid comprises a first aqueous base fluid, micro-proppant particulates, and a first aqueous-based surface modification agent ("ASMA"); placing the micro-proppant particulates into the at least one fracture; introducing a surface modification treatment fluid into the subterranean formation, wherein the surface modification treatment fluid comprises a second aqueous base fluid and a second ASMA; coating at least a portion of a face of the at least one fracture with the second ASMA; introducing a macro-proppant treatment fluid into the subterranean formation, wherein the macro-proppant treatment fluid comprises a third base fluid and macro-proppant particulates; and placing the macro-proppant particulates into the at least one fracture.

19 Claims, 1 Drawing Sheet

(51) Int. Cl.
*C09K 8/80* (2006.01)
*C09K 8/66* (2006.01)
*C09K 8/70* (2006.01)
*C09K 8/92* (2006.01)

(52) U.S. Cl.
CPC ............... *C09K 8/92* (2013.01); *E21B 43/26* (2013.01); *E21B 43/267* (2013.01)

(56) References Cited

U.S. PATENT DOCUMENTS

| | | | | |
|---|---|---|---|---|
| 7,322,411 | B2* | 1/2008 | Brannon | C09K 8/80 166/280.2 |
| 8,205,675 | B2 | 6/2012 | Brannon et al. | |
| 9,206,349 | B2* | 12/2015 | Turakhia | C09K 8/805 |
| 9,719,011 | B2* | 8/2017 | Tanguay | C09K 8/805 |
| 2011/0120712 | A1 | 5/2011 | Todd et al. | |
| 2012/0125617 | A1 | 5/2012 | Gu et al. | |
| 2013/0025867 | A1 | 1/2013 | Sun et al. | |
| 2013/0105154 | A1* | 5/2013 | Vorderbruggen | E21B 43/04 166/271 |
| 2013/0312962 | A1 | 11/2013 | Weaver et al. | |
| 2013/0343858 | A1* | 12/2013 | Flusche | E21B 7/026 414/800 |
| 2015/0083415 | A1* | 3/2015 | Monroe | C09K 8/524 166/276 |

OTHER PUBLICATIONS

Nguyen et al., "Evaluating Treatment Methods for Enhancing Microfracture Conductivity in Tight Formations," SPE Unconventional Resources Conference and Exhibition—Asia Pacific, Brisbane, Australia, 2013, SPE 167092.
International Search Report and Written Opinion for PCT/US2014/010013 dated Oct. 21, 2014.

* cited by examiner

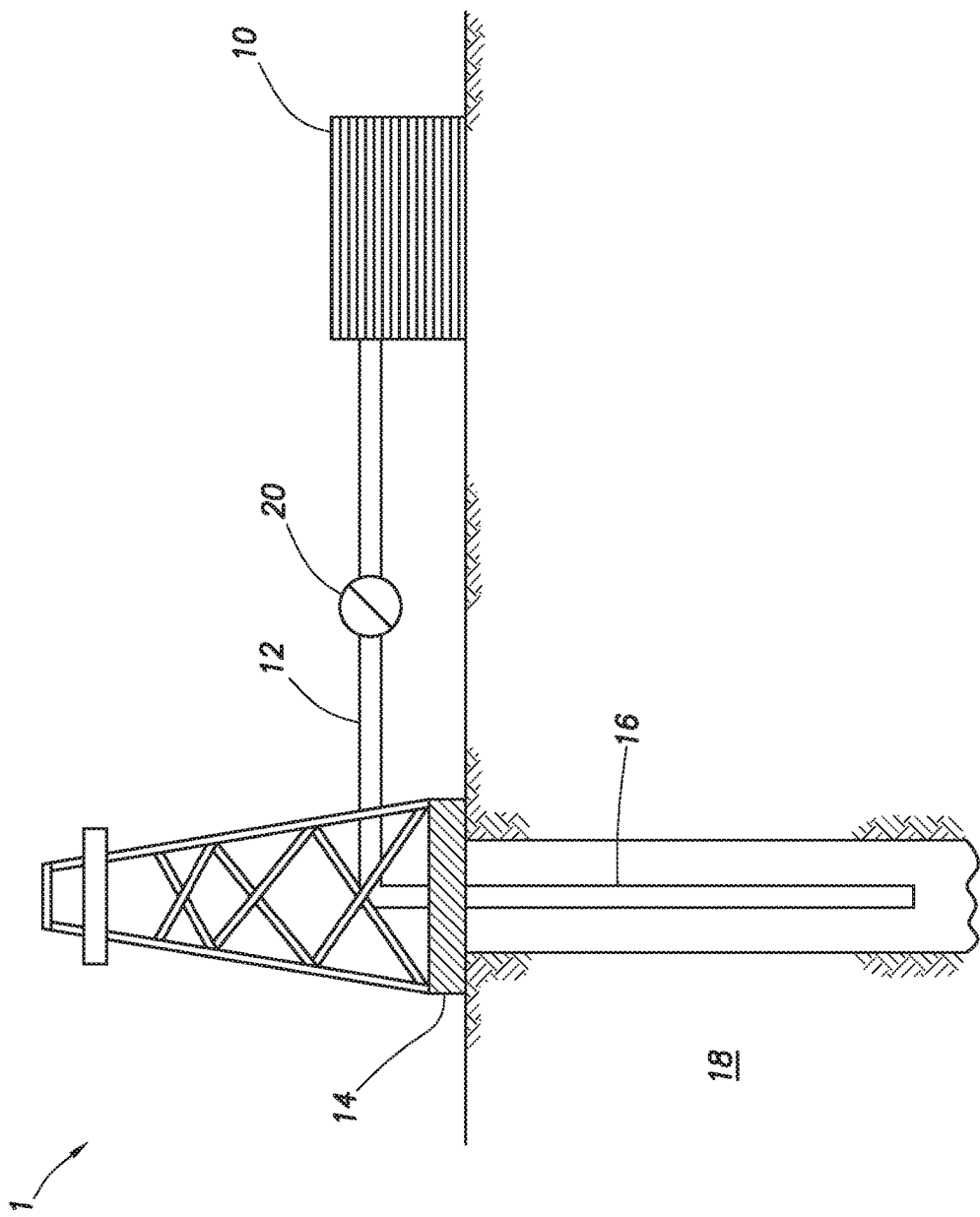

GENERATING AND ENHANCING MICROFRACTURE CONDUCTIVITY

BACKGROUND

The embodiments described herein relate to generating and enhancing microfracture conductivity.

Subterranean wells (e.g., hydrocarbon producing wells, gas producing wells, water producing wells, and the like) are often stimulated by hydraulic fracturing treatments. In traditional hydraulic fracturing treatments, a treatment fluid, which may also function simultaneously or subsequently as a carrier fluid, is pumped into a portion of a subterranean formation (which may also be referred to herein as "formation") at a rate and pressure sufficient to break down the formation and create one or more fractures therein. Typically, particulate solids, such as graded sand, are suspended in a portion of the treatment fluid and then deposited into the fractures. The particulate solids, known as "proppant particulates" (which may also be referred to herein as "proppant" or "propping particulates") serve to prevent the fractures from fully closing once the hydraulic pressure is removed. By keeping the fractures from fully closing, the proppant particulates aid in forming conductive paths through which fluids produced from the formation flow, referred to as a "proppant pack." The degree of success of a stimulation operation depends, at least in part, upon the porosity of the proppant pack to permit the flow of fluids through the interconnected interstitial spaces between abutting proppant particulates.

In the case of stimulating low permeability formations (or "low permeability formations"), such as shale reservoirs or tight-gas sands, increasing fracture complexity during stimulation may enhance the production of the formation. Low permeability formations, such as those described herein, tend to have a naturally occurring network of multiple interconnected fractures referred to as "fracture complexity." As used herein, the term "low permeability formation" refers to a formation that has a matrix permeability of less than 1,000 microdarcy (equivalent to 1 millidarcy). As used herein, the term "ultra-low permeability formation" refers to a formation that has a matrix permeability of less than 1 microdarcy (equivalent to 0.001 millidarcy). As used herein, unless otherwise stated, the term "fracture" or "fractures" will refer collectively to micro-sized fractures (referred to herein as "microfractures") and fractures having larger openings (referred to herein as "macrofractures").

Fracture complexity may be enhanced by stimulation (e.g., fracturing) operations to create new or enhance (e.g., elongate or widen) existing fractures. In such cases, the newly formed fractures may remain open without the assistance of proppant or micro-proppant particulates due to shear offset of the formation forming the fractures, or may have included therein proppant or micro-proppant particulates, depending on the size of the fracture, to assist in keeping them open after hydraulic pressure is removed. The inclusion of proppant or micro-proppant particulates in the fractures, new or natural, may increase the conductivity of a low permeability formation.

In some cases, subterranean treatment operations (e.g., stimulation, proppant placement, micro-proppant placement, and the like), may be supplemented with enhanced oil recovery techniques. Such enhanced oil recovery techniques may operate to enhance the conductivity of fractures. One such technique is acidizing, which involves injecting an acid (e.g., hydrochloric acid) into a subterranean formation in order to etch channels or create microfractures in the face of the formation and/or within an existing macrofracture or microfracture, thereby enhancing the conductivity of the formation. The acid may create a dendritic-like network of channels through which produced fluids may flow.

Acidizing may operate to supplement or enhance the conductivity and production of the formation. Acidizing treatments are preferentially performed at multiple intervals or zones in a subterranean formation so as to maximize fracture complexity. However, such multiple interval treatments may be limited due to acid spending or leak off. If the acid is spent or experiences leak off prior to reaching one or more desired intervals of the subterranean formation (e.g., by leak off in a first or earlier contacted desired interval), it may be insufficiently potent to etch channels and, thus, may not contribute to or may only minimally contribute to enhancing fracture complexity and conductivity.

BRIEF DESCRIPTION OF THE DRAWINGS

The following FIGURES are included to illustrate certain aspects of the embodiments, and should not be viewed as exclusive embodiments. The subject matter disclosed is capable of considerable modifications, alterations, combinations, and equivalents in form and function, as will occur to those skilled in the art and having the benefit of this disclosure.

FIG. 1 depicts an embodiment of a system configured for delivering the fluids of the embodiments described herein to a downhole location.

DETAILED DESCRIPTION

The embodiments described herein relate to generating and enhancing microfracture conductivity. Specifically, the embodiments herein relate to generating and enhancing microfracture conductivity by using a combination of micro-proppant and macro-proppant and an aqueous-based surface modification agent ("ASMA"). The micro-proppant may be able to enter the far field regions or microfractures within a complex fracture network. Moreover, the micro-proppant may be more readily available and at a lower cost than macro-proppant, thereby decreasing the economic impact of certain operations on wellbore operators. The macro-proppant may be able to enter macrofractures (e.g., main fracture branches) within the complex fracture network. As used herein, the term "microfracture" refers to a discontinuity in a portion of a subterranean formation creating a flow channel, the flow channel generally having a fracture width or flow opening size in the range of from about 1 μm to about 100 μm, and any size therebetween. As used herein, the term "macrofracture" refers to a discontinuity in a portion of a subterranean formation creating a flow channel, the flow channel generally having a fracture width or flow size opening greater than about the size of a microfracture. In some cases, a fracture may have, for example, an asterix shape, such that the main body of the fracture is the size of a macrofracture but the tips of the projections are small enough to qualify as microfractures. In such cases, the main body of the fracture is used to determine the type of fracture and, thus, the asterix shaped fracture would be referred to as a macrofracture. The microfractures and macrofractures may be cracks, slots, channels, perforations, holes, or any other ablation within the formation.

The ASMA may be used to coat or otherwise interact with the micro-proppant and the faces of a fracture in the complex fracture network, thereby forming a tacky film or coating that facilitates attachment of the micro-proppant to one another (e.g., the formation of small clusters) and attachment between the fracture face and the macro-proppant, preferably along the entire height and length of the fracture. Coating the micro-proppant and the fracture face with the ASMA may synergistically operate together to enhance vertical distribution of the micro-proppant and the macro-proppant, and may substantially increase the permeability of the complex fracture network.

The small clusters of micro-proppant formed from being coated with the ASMA or being in contact with the ASMA generally do not become dispersed absent the application of shear, allowing them to enter into the at least one fracture without screening-out at the entrance. The micro-proppant clusters enhance formation of a partial monolayer and may form mini-pillars capable of supporting closure of the fracture, thereby enhancing conductivity of the fracture.

Although some embodiments described herein are illustrated by reference to stimulation treatments (e.g., fracturing), the methods and compositions disclosed herein may be used in any subterranean formation operation that may benefit from their gas generating properties. Moreover, the methods and compositions described herein may be used in any non-subterranean operation that may benefit from their gas generating properties. Such operations may be performed in any industry including, but not limited to, oil and gas, mining, chemical, pulp and paper, aerospace, medical, automotive, and the like.

One or more illustrative embodiments disclosed herein are presented below. Not all features of an actual implementation are described or shown in this application for the sake of clarity. It is understood that in the development of an actual embodiment incorporating the embodiments disclosed herein, numerous implementation-specific decisions must be made to achieve the developer's goals, such as compliance with system-related, lithology-related, business-related, government-related, and other constraints, which vary by implementation and from time to time. While a developer's efforts might be complex and time-consuming, such efforts would be, nevertheless, a routine undertaking for those of ordinary skill the art having benefit of this disclosure.

It should be noted that when "about" is provided herein at the beginning of a numerical list, the term modifies each number of the numerical list. In some numerical listings of ranges, some lower limits listed may be greater than some upper limits listed. One skilled in the art will recognize that the selected subset will require the selection of an upper limit in excess of the selected lower limit. Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by the exemplary embodiments described herein. At the very least, and not as an attempt to limit the application of the doctrine of equivalents to the scope of the claim, each numerical parameter should at least be construed in light of the number of reported significant digits and by applying ordinary rounding techniques.

While compositions and methods are described herein in terms of "comprising" various components or steps, the compositions and methods can also "consist essentially of" or "consist of" the various components and steps. When "comprising" is used in a claim, it is open-ended.

Increasing fracture complexity in subterranean formations, particularly in tight subterranean formations, may increase the conductivity and productivity of the formation. The permeability of a formation is a measure of the formation's resistance to through-flow fluid. Thus, low permeability formations require considerable applied pressure in order to flow fluid through its pore spaces, as compared to formations having higher permeabilities.

Examples of such low permeability formations include, but are not limited to, shale reservoirs and tight-gas sands. Shale reservoirs are sources of hydrocarbons comprising complex, heterogeneous rock with low permeability. Shale reservoirs may have permeabilities as low as less than about 0.001 millidarcy ("mD") ($9.869233 \times 10^{-19}$ m$^2$), and even as low as less than about 0.0001 mD ($9.869233 \times 10^{-20}$ m$^2$). Tight-gas sands are low permeability formations that produce mainly dry natural gas and may include tight-gas carbonates, tight-gas shales, coal-bed methane, and the like. Tight-gas sands may have permeabilities as low as less than about 1 mD ($9.869233 \times 10^{-16}$ m$^2$), and even as low as less than about 0.01 mD ($9.869233 \times 10^{-18}$ m$^2$).

In some embodiments disclosed herein, a method is provided comprising providing a subterranean formation having a first treatment interval. A micro-proppant treatment fluid may be provided comprising a first aqueous base fluid, micro-proppant particulates, and a first aqueous-based surface modification agent. The micro-proppant treatment fluid may be introduced into the subterranean formation at a rate and pressure sufficient to create or enhance at least one fracture in the first treatment interval and to place the micro-proppant particulates into the at least one fracture. As discussed above, the fracture may be a microfracture or a macrofracture. Moreover, in some embodiments, existing fractures may be present in the first treatment interval. The micro-proppant particulates may be placed into the far reaches of a macrofracture, which may be very small, or within a microfracture to prop open portions or all of those fractures after hydraulic pressure is removed. A surface modification treatment comprising a second aqueous base fluid and a second aqueous-based surface modification agent may then be introduced into the subterranean formation so as to coat at least a portion of a face of the at least one fracture. Next, a macro-proppant treatment fluid comprising a third base fluid and macro-proppant particulates may be introduced into the subterranean formation to place the macro-proppant particulates into the at least one fracture.

As used herein, the term "micro-proppant particulates" and all of its variants (e.g., "micro-proppant") refers to particulates capable of holding fractures (e.g., microfractures) open after a hydraulic fracturing treatment and having a size in the range of from a lower limit of about 1 μm, 7.5 μm, 15 μm, 22.5 μm, 30 μm, 37.5 μm, 45 μm, 52.5 μm, 60 μm, 67.5 μm, and 75 μm to an upper limit of about 150 μm, 142.5 μm, 135 μm, 127.5 μm, 120 μm, 112.5 μm, 105 μm, 97.5 μm, 90 μm, 82.5 μm, and 75 μm. As used herein, the term "macro-proppant particulates" refers to particles capable of holding fractures (e.g., macrofractures) open after a hydraulic fracturing treatment and having a size greater than micro-proppant particulates, which may be in the range of from a lower limit of about 100 μm, 220 μm, 340 μm, 460 μm, 580 μm, 700 μm, 820 μm, 940 μm, 1060 μm, 1180 μm, and 1300 μm to an upper limit of about 2500 μm, 2380 μm, 2260 μm, 2140 μm, 2020 μm, 1900 μm, 1780 μm, 1660 μm, 1540 μm, 1420 μm, and 1300 μm. The combination of the micro-proppant particulates and the macro-proppant particulates may serve to prop the at least one fracture, or form a "proppant pack," throughout the entire or substantially the entire length of the at least one fracture (e.g., including branching fractures forming a complex fracture). As used herein, the term "proppant pack" refers to a collection of a mass of proppant particulates within a fracture or open space in a subterranean formation.

The first ASMA may associate with the micro-proppant particulates in the micro-proppant treatment fluid such that the micro-proppant particulates are at least partially anchored in the fracture or portions of the fracture. The second ASMA in the surface modification treatment fluid may coat the surface of at least a portion of a face of the at least one fracture in the first treatment interval in the subterranean formation, thereby facilitating adherence of the macro-proppant particulates in the fracture or portions of the fracture. The presence of the first and second ASMA substantially increases the permeability of the fracture, thus allowing greater flow of production fluids therethrough.

In some embodiments, the first ASMA may be coated onto the micro-proppant particulates, thereby forming coated micro-proppant particulates. The micro-proppant particulates may be coated with the first ASMA by any means known to those of skill in the art, such as wet-coating or dry-coating. As used herein, the term "coating," and all of its variants (e.g., "coat," "coated," and the like) does not imply any particular degree of coating on a particulate; in particular, the term "coating" does not imply 100% coverage by the coating on a particulate. In some embodiments, the first ASMA may be included in the micro-proppant treatment fluid without coating the micro-proppant particulates. It may be possible that the micro-proppant particulates become at least partially coated with the first ASMA by freely associating together within the micro-proppant treatment fluid.

Although the first ASMA treatment and the second ASMA treatment may synergistically operate together to enhance conductivity of the at least one fracture, in some embodiments, the methods herein may use either one or both of the treatments. For example, in some embodiments, a method is provided comprising providing a subterranean formation having a first treatment interval. A micro-proppant treatment fluid may be provided comprising an aqueous base fluid, micro-proppant particulates, and an aqueous-based surface modification agent. The micro-proppant treatment fluid may be introduced into the subterranean formation at a rate and pressure sufficient to create or enhance at least one fracture in the first treatment interval and to place the micro-proppant particulates into the at least one fracture, thereby forming a proppant pack therein. In other embodiments, a method is provided comprising providing a subterranean formation having a first treatment interval. A surface modification treatment fluid comprising an aqueous base fluid and a surface modification agent may be introduced into the subterranean formation at a rate and pressure sufficient to create or enhance at least one fracture in the first treatment interval. Next, a macro-proppant treatment fluid comprising a third base fluid and macro-proppant particulates may be introduced into the subterranean formation to place the macro-proppant particulates into the at least one fracture. In yet other embodiments, the fractures may be created by other means prior to introducing either the micro-proppant treatment fluid or the surface modification treatment fluid and the macro-proppant treatment fluid, without departing from the scope of this disclosure.

In some embodiments, the steps of introducing the micro-proppant treatment fluid (including embodiments where the micro-proppant particulates are coated with the first ASMA) into the subterranean formation and placing the micro-proppant particulates into the at least one fracture in the first treatment interval, introducing the surface modification treatment fluid and coating at least a portion of a face of the at least one fracture, and introducing the macro-proppant particulates into the subterranean formation and placing the micro-proppant particulates into the at least one fracture may be repeated at least once at a second treatment interval. As used herein, the term "treatment interval" in all of its forms refers to a portion of a subterranean formation bearing hydrocarbons (e.g., a portion of the subterranean formation likely to produce hydrocarbons through fractures and into a wellbore penetrating the formation). In some embodiments, multiple treatment intervals may be treated with the methods described in some embodiments herein.

In some embodiments, the macro-proppant treatment fluid may further comprise degradable macro-proppant particulates and the degradable macro-proppant particulates may be degraded so as to form voids or openings within the proppant pack in the at least one fracture at the first treatment interval. The voids or openings in the proppant pack may serve to enhance the permeability and conductivity of the fracture, thereby permitting greater recovery of produced fluids. In some embodiments, the steps of introducing the micro-proppant treatment fluid (including embodiments where the micro-proppant particulates are coated with the first ASMA) into the subterranean formation and placing the micro-proppant particulates into the at least one fracture in the first treatment interval, introducing the surface modification treatment fluid and coating at least a portion of a face of the at least one fracture, introducing the macro-proppant treatment fluid further comprising degradable particulates into the subterranean formation and placing the micro-proppant particulates into the at least one fracture, and degrading the degradable macro-proppant particulates may be repeated at least once at a second treatment interval.

In some embodiments, the macro-proppant treatment fluid, with or without the degradable macro-proppant particulates may be introduced into the subterranean formation intermittently between a substantially solids-free fluid, so as to alternate the macro-proppant treatment fluid and the substantially solids-free fluid within the at least one fracture. By alternating the two fluids, the formation of separate islands or pillars of the macro-proppant particulates may be formed with void space therebetween. The substantially solids-free fluid may be removed or allowed to dissipate out of the at least one fracture, thereby allowing production fluids to flow not only between the interstitial spaces between the macro-proppant particulates or any voids formed by degrading any degradable macro-proppant that may be present (and through the interstitial spaces between the micro-proppant particulates), but also though the space between the pillars of macro-proppant particulates.

As used herein, the micro-proppant treatment fluid, the surface modification treatment fluid, and the macro-proppant treatment fluid prepared according to any embodiment described herein may be collectively referred to herein as "treatment fluids." In some embodiments, any or all of the treatment fluids may be prepared on-the-fly at the well site. As used herein, the term "on-the-fly" refers to performing an operation during a subterranean treatment that does not require stopping normal operations. Thus, the components a treatment fluid described herein may be combined together as the fluid is pumped into the subterranean formation, for example.

The first and second ASMA (collectively referred to herein as "ASMA," unless otherwise stated) for use in the embodiments described herein may render one or more surfaces (e.g., the micro-proppant particulates and/or the face of the at least one fracture) tacky, such as by forming a coating thereon. As used herein, the term "tacky" in all its forms, refers to a substance that is somewhat sticky to the touch. When the ASMA imparts tackiness, it may serve to immobilize the micro-proppant particulates and/or the macro-proppant particulates and prevent them from migrating out of formed fractures, thereby enhancing the conductivity of the formation. The ASMA may also serve to hinder the tight packing of individual micro-proppant particulates and/or macro-proppant particulates within a proppant pack, resulting in a proppant pack possessing more void spaces and, thus, increased permeability and conductivity compared to proppant lacking the tackiness provided by the ASMA.

Suitable ASMAs for use in the embodiments described herein may be any compound that is capable of imparting the tackifying qualities during a subterranean operation. The ASMAs may be liquids or in solution at the temperature of the subterranean formation such that they are, by themselves, nonhardening under reservoir conditions. Suitable examples of compounds for use as ASMAs in the methods and compositions described herein include, but are not limited to, a polyamide; a polyester; a polycarbonate; a polycarbamate; a curable resin; a zeta-potential reducing agent; and any combination thereof. In some embodiments, the first ASMA may be present in the micro-proppant treatment fluid in an amount in the range of from a lower limit of about 0.01%, 0.05%, 0.1%, 0.15%, 0.2%, 0.25%, 0.3%, 0.35%, 0.4%, 0.45%, and 0.5% to an upper limit of about 1%, 0.95%, 0.9%, 0.85%, 0.8%, 0.75%, 0.7%, 0.65%, 0.6%, 0.55%, and 0.5% by volume of the micro-proppant treatment fluid. In some embodiments, the second ASMA may be present in the surface modification treatment fluid in an amount in the range of from a lower limit of about 2 times to about 5 times the amount of the first ASMA present in the micro-proppant treatment fluid, and any amount therebetween. For example, in some embodiments, the second ASMA may be present in an amount in the range of from a lower limit of about 0.05%, 0.25%, 0.5%, 0.75%, 1%, 1.25%, 1.5%, 1.75%, 2%, 2.25%, and 2.5% to an upper limit of about 5%, 4.75%, 4.5, 4.25%, 4%, 3.75%, 3.5%, 3.25%, 3%, 2.75%, and 2.5% by volume of the macro-proppant treatment fluid.

The polyamides for use as the ASMA of the embodiments described herein may be synthetic or natural. The polyamides may be formed, for example, by a condensation reaction product comprising of a polyacid and a polyamine. Such polyamide compounds may include combinations of dibasic acids containing some trimer and higher oligomers and also small amounts of monomer acids that are reacted with polyamines. Other polyacids include trimer acids, synthetic acids produced from fatty acids, maleic anhydride, acrylic acid, and the like. Combinations of these may be suitable as well. The polyamide for use in the embodiments disclosed herein may be a silyl-modified polyamide compound. Such silyl-modified polyamides may be based, for example, on the reaction product of a silylating compound with a polyamide or a mixture of polyamides. The polyamide or mixture of polyamides may be one or more polyamide intermediate compounds obtained, for example, from the reaction of a polyacid (e.g., diacid or higher) with a polyamine (e.g., diamine or higher) to form a polyamide polymer with the elimination of water. Other suitable silyl-modified polyamides and methods of making such compounds are described in U.S. Pat. No. 6,439,309, the entire disclosure of which is herein incorporated by reference.

In some embodiments, the ASMA of may be a polyester. Suitable polyesters may be formed by the reaction of a polyhydric alcohol (e.g., dihydric or higher) and a polybasic acid (e.g., dibasic or higher). Suitable polyhydric alcohols may include, but are not limited to, a glycol; ethylene glycol; diethylene glycol; triethylene glycol; tetraethylene glycol; polyethylene glycol; dipropylene glycol; polypropylene glycol; dibutylene glycol; polybutylene glycol; 1,2-propylene glycol; 1,3-propylene glycol; 1,4-butylene glycol; 2,3-butylene glycol; 1,6-hexanediol; 1,8-octanediol; neopentyl glycol; 1,4-bis-hydroxymethylcyclohexane; 2-methyl-1,3-propanediol; glycerol; trimethylolpropane; 1,2,6-hexanetriol; 1,2,4-butanetriol; trimethylolethane; pentaerythritol; quinitol; mannitol; sorbitol; methylglycoside; and any combination thereof. Suitable polybasic acids may include, but are not limited to, succinic acid; adipic acid; suberic acid; azelaic acid; sebacic acid; phthalic acid, isophthalic acid; trimellitic acid; phthalic anhydride; tetrahydrophthalic anhydride; hexahydrophthalic anhydride; tetrachlorophthalic anhydride; endomethylenetetrahydrophthalic anhydride; glutaric anhydride; maleic acid; maleic anhydride; fumaric acid; a polymeric fatty acid (e.g., oleic acid); and any combination thereof.

The polycarbonates for use as the ASMA of the embodiments herein are characterized as having multiple carbonate groups. The polycarbonates may be formed by the reaction product of a polyol and a phosgene. The polyol may be linear or branched and suitable examples may include, but are not limited to, bisphenol A; ethylene glycol; diethylene glycol; triethylene glycol; tetraethylene glycol 1,3-propanediol; 1-4-butanediol; 1,5-pentanediol; 1-6-hexanediol; 1,2-propanediol; 1,2-butanediol; 2,3-butanediol; 1,3-butanediol; 1,2-pentanediol; ethohexadiol; p-menthane-3,8-diol; 2-methyl-2,4-pentanediol; and any combination thereof.

The polycarbamates for use as the ASMA of the embodiments herein are derived from carbamic acid, and may include polycarbamate esters. The polycarbamates may be formed by the reaction product of a polyol and carbamic acid. The polyol may be linear or branched and suitable examples may include, but are not limited to, bisphenol A; ethylene glycol; diethylene glycol; triethylene glycol; tetraethylene glycol 1,3-propanediol; 1-4-butanediol; 1,5-pentanediol; 1-6-hexanediol; 1,2-propanediol; 1,2-butanediol; 2,3-butanediol; 1,3-butanediol; 1,2-pentanediol; ethohexadiol; p-menthane-3,8-diol; 2-methyl-2,4-pentanediol; and any combination thereof. Additionally, the reaction may be performed in the presence of a tertiary amine.

In some embodiments, the ASMA of the embodiments described herein may be a curable resin. Any curable resin may be used, provided that it is capable of acting as an ASMA, as described herein. Some suitable curable resins may include, but are not limited to, a two component epoxy based resins; a novolak resin; a polyepoxide resin; a phenol-aldehyde resin; a urea-aldehyde resin; a urethane resin; a phenolic resin; a furan resin; a furan/furfuryl alcohol resin; a phenolic/latex resin; a phenol formaldehyde resin; a polyester resin; a polyester resin hybrid; a polyester resin copolymer; a polyurethane resin; a polyurethane resin hybrid; a polyurethane resin copolymer; an acrylate resin; a silicon-based resin; and any combination thereof. Some suitable curable resins, such as epoxy resins, may be cured with an internal catalyst or activator so that when pumped down hole, they may be cured using only time and temperature. Other suitable curable resins, such as furan resins generally require a time-delayed catalyst or an external catalyst to help activate the polymerization of the resins if the cure temperature is low (i.e., less than 250° F. (121.1° C.)), but will cure under the effect of time and temperature if the formation temperature is above about 250° F. (121.1° C.), preferably above about 300° F. (148.9° C.). It is within the ability of one skilled in the art, with the benefit of this disclosure, to select a suitable curable resin for use in embodiments described herein and to determine whether a catalyst is required to trigger curing.

In some embodiments, the ASMA may be a zeta-potential reducing agent. The zeta-potential reducing agents suitable for use in the embodiments described herein may be formed, for example, by a reaction of an amine and a phosphate ester, such that the zeta-potential reducing agent is capable of altering the zeta potential of a surface. Suitable zeta-potential reducing agents and their methods of use can be found in U.S. Pat. Nos. 7,392,847 and 7,956,017, the entire disclosures of which are hereby incorporated by reference.

Suitable amines for use in producing the zeta-potential reducing agents for use as ASMAs may include, but are not limited to, any amine that is capable of reacting with a suitable phosphate ester to form a composition that alters the zeta potential of a surface. Suitable examples of such amines may include, but are not limited to, any amine of the general formula $R_1,R_2NH$ or mixtures and combinations thereof, where $R_1$ and $R_2$ are independently a hydrogen atom or a carbyl group having between about 1 and 40 carbon atoms and the required hydrogen atoms to satisfy valence and where one or more of the carbon atoms can be replaced by one or more hetero atoms which may be selected from the group consisting of boron; nitrogen; oxygen; phosphorus; sulfur; and combinations thereof, and where one or more of the hydrogen atoms can be replaced by one or more single valence atoms that may be selected from the group consisting of fluorine; chlorine; bromine; iodine; mixtures thereof; and combinations thereof. Suitable examples of amines may include, but are not limited to, aniline and alkyl aniline or mixtures of alkyl aniline; pyridine and alkyl pyridine or mixtures of alkyl pyridine; pyrrole and alkyl pyrrole or mixtures of alkyl pyrrole; piperidine and alkyl piperidine or mixtures of alkyl piperidine; pyrrolidine and alkyl pyrrolidine or mixtures of alkyl pyrrolidine; indole and alkyl indole or mixture of alkyl indole; imidazole and alkyl imidazole or mixtures of alkyl imidazole; quinoline and alkyl quinoline or mixture of alkyl quinolone; isoquinoline and alkyl isoquinoline or mixture of alkyl isoquinoline; pyrazine and alkyl pyrazine or mixture of alkyl pyrazine; quinoxaline and alkyl quinoxaline or mixture of alkyl quinoxaline; acridine and alkyl acridine or mixture of alkyl acridine; pyrimidine and alkyl pyrimidine or mixture of alkyl pyrimidine; quinazoline and alkyl quinazoline or mixture of alkyl quinazoline; mixtures thereof; and combinations thereof.

Suitable phosphate esters for use in producing the zeta-potential reducing agents may include, but are not limited to, any phosphate ester that is capable of reacting with a suitable amine to form a composition that alters the zeta potential of a surface. Suitable examples of such phosphate esters may include, but are not limited to, any phosphate esters of the general formula $P(O)(OR^3)(OR^4)(OR^5)$ or mixture and combinations thereof, where $R^3$, $R^4$, and $OR^5$ are independently a hydrogen atom or a carbyl group having between about 1 and 40 carbon atoms and the required hydrogen atoms to satisfy valence and where one or more of the carbon atoms can be replaced by one or more hetero atoms that may be selected from the group consisting of boron; nitrogen; oxygen; phosphorus; sulfur; and combinations thereof and where one or more of the hydrogen atoms can be replaced by one or more single valence atoms that may be selected from the group consisting of fluorine; chlorine; bromine; iodine; and combinations thereof. Suitable examples of phosphate esters may include, but are not limited to, phosphate ester of alkanols having the general formula $P(O)(OH)_x(OR^6)_y$ where x+y=3 and are independently a hydrogen atom or a carbyl group having between about 1 and 40 carbon atoms and the required hydrogen atoms to satisfy valence and where one or more of the carbon atoms can be replaced by one or more hetero atoms that may be selected from the group consisting of boron; nitrogen; oxygen; phosphorus; sulfur; and combinations thereof and where one or more of the hydrogen atoms can be replaced by one or more single valence atoms that may be selected from the group consisting of fluorine; chlorine; bromine; iodine; and combinations thereof, such as ethoxy phosphate; propoxyl phosphate; higher alkoxy phosphates; and combinations thereof. Other exemplary examples of phosphate esters may include, but are not limited to, phosphate esters of alkanol amines having the general formula $N[R^7OP(O)(OH)_2]_3$, where $R^7$ is a carbenyl group having between about 1 and 40 carbon atoms and the required hydrogen atoms to satisfy valence and where one or more of the carbon atoms can be replaced by one or more hetero atoms that may be selected from the group consisting of boron; nitrogen; oxygen; phosphorus; sulfur; and combinations thereof and where one or more of the hydrogen atoms can be replaced by one or more single valence atoms that may be selected from the group consisting of fluorine; chlorine; bromine; iodine; and combinations thereof, including the tri-phosphate ester of tri-ethanol amine, and combinations thereof. Other examples of phosphate esters may include, but are not limited to, phosphate esters of hydroxylated aromatics (e.g., phosphate esters of alkylated phenols such as nonylphenyl phosphate ester or phenolic phosphate esters). Other examples of phosphate esters may include, but are not limited to, phosphate esters of diols and polyols (e.g., phosphate esters of ethylene glycol, propylene glycol, or higher glycolic structures).

The micro-proppant treatment fluid, the surface modification treatment fluid, and the macro-proppant treatment fluids may be collectively referred to herein as "treatment fluids." The micro-proppant treatment fluid may comprise a first aqueous base fluid, the surface modification treatment fluid may comprise a second aqueous base fluid, and the macro-proppant treatment fluid may comprise a third aqueous base fluid, all of which may be collectively referred to herein as "aqueous base fluids." The aqueous base fluid selected for the micro-proppant treatment fluid, the surface modification treatment fluid, and the macro-proppant treatment fluid may be alike or each different, depending on the subterranean operation being performed, or based on other factors. For example, in some embodiments, the micro-proppant treatment fluid, the surface modification treatment fluid, and the macro-proppant treatment fluid may each comprise the same aqueous base fluid. In other embodiments, the micro-proppant treatment fluid, the surface modification treatment fluid, and the macro-proppant treatment fluid may each comprise a different type of aqueous base fluid. In yet other embodiments, two of the micro-proppant treatment fluid, the surface modification treatment fluid, and the macro-proppant treatment fluid may comprise the same type aqueous base fluid and the third may comprise a different type of aqueous base fluid.

The aqueous base fluid for use in the treatment fluids of the embodiments described herein may be any aqueous fluid capable of being delivered to a subterranean formation. Suitable aqueous base fluids may include fresh water, saltwater (e.g., water containing one or more salts dissolved therein), brine (e.g., saturated salt water), seawater, and any combination thereof. Generally, the water that may form part or all of an aqueous base fluid may be from any source, provided that it does not contain components that might adversely affect the stability and/or performance of the treatment fluids. In certain embodiments, the density of the aqueous base fluid may be adjusted, among other purposes, to provide additional particulate transport and suspension in the treatment fluids used in the methods of the embodiments of the present disclosure. In certain embodiments, the pH of the fluid may be adjusted (e.g., by a buffer or other pH adjusting agent), among other purposes, to activate a crosslinking agent and/or to reduce the viscosity of the treatment fluid (e.g., activate a breaker, deactivate a crosslinking agent). One of ordinary skill in the art, with the benefit of this disclosure, will recognize when such density and/or pH adjustments are appropriate. In some embodiments, the pH range may preferably be from about 4 to about 11.

In some embodiments, the treatment fluids may further comprise a gelling agent. The gelling agent may be any substance (e.g., a polymeric material) capable of increasing the viscosity of the treatment fluid. In some embodiments, a gelling agent may preferably be included in the micro-proppant treatment fluid and/or the macro-proppant treatment fluid. The gelling agent may comprise one or more polymers that have at least two molecules that are capable of forming a crosslink in a crosslinking reaction in the presence of a crosslinking agent, and/or polymers that have at least two molecules that are so crosslinked (i.e., a crosslinked gelling agent). The gelling agents may be naturally-occurring gelling agents; synthetic gelling agents; and any combination thereof. Suitable gelling agents may include, but are not limited to, a polysaccharide; a biopolymer; and/or derivatives thereof that contain one or more of these monosaccharide units: galactose, mannose, glucoside, glucose, xylose, arabinose, fructose, glucuronic acid, or pyranosyl sulfate. Examples of suitable polysaccharides may include, but are not limited to, a guar gum (e.g., hydroxyethyl guar, hydroxypropyl guar, carboxymethyl guar, carboxymethylhydroxyethyl guar, and carboxymethylhydroxypropyl guar); a cellulose; a cellulose derivative (e.g., hydroxyethyl cellulose, carboxyethylcellulose, carboxymethylcellulose, and carboxymethylhydroxyethylcellulose); xanthan; scleroglucan; succinoglycan; diutan; and any combination thereof.

Suitable synthetic polymers for use as gelling agents may include, but are not limited to, 2,2'-azobis(2,4-dimethyl valeronitrile); 2,2'-azobis(2,4-dimethyl-4-methoxy valeronitrile); polymers and copolymers of acrylamide ethyltrimethyl ammonium chloride; acrylamide; acrylamido-alkyl trialkyl ammonium salts; methacrylamido-alkyl trialkyl ammonium salts; acrylamidomethylpropane sulfonic acid; acrylamidopropyl trimethyl ammonium chloride; acrylic acid; dimethylaminoethyl methacrylamide; dimethylaminoethyl methacrylate; dimethylaminopropyl methacrylamide; dimethylaminopropylmethacrylamide; dimethyldiallylammonium chloride; dimethylethyl acrylate; fumaramide; methacrylamide; methacrylamidopropyl trimethyl ammonium chloride; methacrylamidopropyldimethyl-n-dodecylammonium chloride; methacrylamidopropyldimethyl-n-octylammonium chloride; methacrylamidopropyltrimethylammonium chloride; methacryloylalkyl trialkyl ammonium salts; methacryloylethyl trimethyl ammonium chloride; methacrylylamidopropyldimethylcetylammonium chloride; N-(3-sulfopropyl)-N-methacrylamidopropyl-N,N-dimethyl ammonium betaine; N,N-dimethylacrylamide; N-methylacrylamide; nonylphenoxypoly(ethyleneoxy)ethylmethacrylate; partially hydrolyzed polyacrylamide; poly 2-amino-2-methyl propane sulfonic acid; polyvinyl alcohol; sodium 2-acrylamido-2-methylpropane sulfonate; quaternized dimethylaminoethylacrylate; quaternized dimethylaminoethylmethacrylate; any derivative thereof; and any combination thereof. In certain embodiments, the gelling agent comprises an acrylamide/2-(methacryloyloxy)ethyltrimethylammonium methyl sulfate copolymer. In certain embodiments, the gelling agent may comprise an acrylamide/2-(methacryloyloxy)ethyltrimethylammonium chloride copolymer. In other embodiments, the gelling agent may comprise a derivatized cellulose that comprises cellulose grafted with an allyl or a vinyl monomer.

Additionally, polymers and copolymers that comprise one or more functional groups (e.g., hydroxyl, cis-hydroxyl, carboxylic acids, derivatives of carboxylic acids, sulfate, sulfonate, phosphate, phosphonate, amino, or amide groups) may be used as gelling agents.

The gelling agent may be present in the treatment fluids of the embodiments described herein in an amount sufficient to provide the desired viscosity. In some embodiments, the gelling agents (i.e., the polymeric material) may be present in an amount in the range of from a lower limit of about 0.1%, 0.25%, 0.5%, 0.75%, 1%, 1.25%, 1.5%, 1.75%, 2%, 2.25%, 2.5%, 2.75%, 3%, 3.25%, 3.5%, 3.75%, 4%, 4.25%, 4.5%, 4.75%, and 5% to an upper limit of about 10%, 9.75%, 9.5%, 9.25%, 9%, 8.75%, 8.5%, 8.25%, 8%, 7.75%, 7.5%, 7.25%, 7%, 6.75%, 6.5%, 6.25%, 6%, 5.75%, 5.5%, 5.25%, and 5% by weight of the treatment fluid. In certain embodiments, the gelling agents may be present in an amount in the range of from about 0.15% to about 2.5% by weight of the treatment fluid.

In those embodiments described herein where it is desirable to crosslink the gelling agent(s), the treatment fluids may comprise one or more crosslinking agents. The crosslinking agents may comprise a borate ion, a metal ion, or similar component that is capable of crosslinking at least two molecules of the gelling agent. Examples of suitable crosslinking agents may include, but are not limited to, a borate ion; a magnesium ion; a zirconium IV ion; a titanium IV ion; an aluminum ion; an antimony ion; a chromium ion; an iron ion; a copper ion; a magnesium ion; a zinc ion; and any combination thereof. These ions may be provided by providing any compound that is capable of producing one or more of these ions. Examples of such compounds may include, but are not limited to, ferric chloride; boric acid; disodium octaborate tetrahydrate; sodium diborate; a pentaborate; ulexite; colemanite; magnesium oxide; zirconium lactate; zirconium triethanol amine; zirconium lactate triethanolamine; zirconium carbonate; zirconium acetylacetonate; zirconium malate; zirconium citrate; zirconium diisopropylamine lactate; zirconium glycolate; zirconium triethanol amine glycolate; zirconium lactate glycolate; titanium lactate; titanium malate; titanium citrate; titanium ammonium lactate; titanium triethanolamine; titanium acetylacetonate; aluminum lactate; aluminum citrate; an antimony compound; a chromium compound; an iron compound; a copper compound; a zinc compound; and any combination thereof. In certain embodiments of the described herein, the crosslinking agent may be formulated to remain inactive until it is "activated" by, among other things, certain conditions in the treatment fluid (e.g., pH, temperature, etc.) and/or interaction with some other substance. In some embodiments, the activation of the crosslinking agent may be delayed by encapsulation with a coating (e.g., a porous coating through which the crosslinking agent may diffuse slowly, or a degradable coating that degrades downhole) that delays the release of the crosslinking agent until a desired time or place. The choice of a particular crosslinking agent will be governed by several considerations that will be recognized by one skilled in the art, including but not limited to, the type of gelling agent(s) selected, the molecular weight of the gelling agent(s) selected, the conditions in the subterranean formation being treated, the safety handling requirements, the pH of the treatment fluid, the temperature of the subterranean formation, the desired delay for the crosslinking agent to crosslink the gelling agent molecules, and the like.

When included, suitable crosslinking agents may be present in the treatment fluids useful in the embodiments described herein in an amount sufficient to provide the desired degree of crosslinking between molecules of the gelling agent. In certain embodiments, the crosslinking agent may be present in an amount in the range of from a lower limit of about 0.005%, 0.05%, 0.1%, 0.15%, 0.2%, 0.025%, 0.3%, 0.35%, 0.4%, 0.45%, and 0.5% to an upper limit of about 1%, 0.95%, 0.9%, 0.85%, 0.8%, 0.75%, 0.7%, 0.65%, 0.6%, 0.55%, and 0.5% by weight of the treatment fluid. In certain embodiments, the crosslinking agent may be present in an amount in the range of from about 0.05% to about 1% by weight of the treatment fluid. One of ordinary skill in the art, with the benefit of this disclosure, will recognize the appropriate amount of crosslinking agent to include in a treatment fluid of the embodiments described herein based on a number of factors, such as the temperature conditions of a particular application, the type of gelling agent(s) selected, the molecular weight of the gelling agent(s), the desired degree of viscosification, the pH of the treatment fluid, and the like.

In some embodiments, the treatment fluids of the embodiments described herein may further comprise an additive selected from the group consisting of a salt; a weighting agent; an inert solid; a fluid loss control agent; an emulsifier; a dispersion aid; a corrosion inhibitor; an emulsion thinner; an emulsion thickener; a gelling agent; a surfactant; a lost circulation material; a foaming agent; a gas; a pH control additive; a breaker; a biocide; a crosslinker; a chelating agent; a scale inhibitor; a gas hydrate inhibitor; an oxidizer; a reducer; a friction reducer; a clay stabilizing agent; and any combination thereof.

The micro-proppant particulates and the macro-proppant may be any material capable of propping open a fracture after hydraulic pressure is removed. Suitable materials for the stable proppant particulates may include, but are not limited to, sand; bauxite; ceramic material (e.g., ceramic microspheres); glass material; polymeric material (e.g., ethylene-vinyl acetate or composite materials); polytetrafluoroethylene material; nut shell pieces; a cured resinous particulate comprising nut shell pieces; seed shell pieces; a cured resinous particulate comprising seed shell pieces; fruit pit pieces; a cured resinous particulate comprising fruit pit pieces; wood; composite particulates; and any combination thereof. Suitable composite particulates may comprise a binder and a filler material, wherein suitable filler materials may include, but are not limited to, silica; alumina; fumed carbon; carbon black; graphite; mica; titanium dioxide; barite; meta-silicate; calcium silicate; kaolin; talc; zirconia; boron; fly ash; hollow glass microspheres; solid glass; and any combination thereof.

The degradable macro-proppant particulates for use in the macro-proppant treatment fluid may be any degradable material capable of degrading over time or under certain conditions (e.g., temperature, pH, and the like). In some embodiments, the degradable material may be oil-degradable, such that the degradable macro-proppant particulates may degrade as hydrocarbons are produced. Suitable oil-degradable materials may include natural or synthetic polymers, including, but not limited to, a polyacrylic; a polyamide; a polyolefin (e.g., polyethylene, polypropylene, polyisobutylene, and polystyrene); and any combination thereof. Other suitable oil-degradable materials include those that have a melting point which is such that the material (e.g., polymer) will melt or dissolve at the temperature of the subterranean formation in which it is placed (e.g., a wax material).

In addition to oil-degradable material, other degradable materials may be used in the embodiments described herein including, but not limited to, degradable polymers; dehydrated salts; and any combination thereof. Suitable examples of degradable polymers for forming the degradable macro-proppant particulates may include, but are not limited to, a polysaccharide (e.g., dextran or cellulose); a chitin; a chitosan; a protein; an aliphatic polyester; a poly(lactide); a poly(glycolide); a poly(ε-caprolactone); a poly(hydroxybutyrate); a poly(anhydride); an aliphatic polycarbonate; an aromatic polycarbonate; a poly(orthoester); a poly(amino acid); a poly(ethylene oxide); a polyphosphazenes; and any combination thereof. Of these suitable degradable materials, aliphatic polyesters and polyanhydrides may be preferred. Polyanhydride hydrolysis may proceed, in situ, via free carboxylic acid chain-ends to yield carboxylic acids as final degradation products. The degradation time can be varied over a broad range by changes in the polymer backbone. Examples of suitable polyanhydrides may include, but are not limited to, poly(adipic anhydride), poly(suberic anhydride), poly(sebacic anhydride), and poly(dodecanedioic anhydride). Other suitable examples may include, but are not limited to, poly(maleic anhydride) and poly(benzoic anhydride).

Dehydrated salts may be used in accordance with the embodiments herein as a degradable material for forming the degradable macro-proppant particulates. A dehydrated salt may be suitable for use if it will degrade over time as it hydrates. For example, a particulate solid anhydrous borate material that degrades over time may be suitable. Specific examples of particulate solid anhydrous borate materials that may be used may include, but are not limited to, anhydrous sodium tetraborate (also known as anhydrous borax); anhydrous boric acid; and any combination thereof. These anhydrous borate materials are only slightly soluble in water. However, with time and heat in a subterranean environment, the anhydrous borate materials react with the surrounding aqueous fluid and may become hydrated. The resulting hydrated borate materials may be highly soluble in water as compared to anhydrous borate materials and as a result degrade in the aqueous fluid. Other examples include organic or inorganic salts like acetate trihydrate.

Blends of certain degradable materials may also be suitable. One example of a suitable blend of materials is a mixture of poly(lactic acid) and sodium borate where the mixing of an acid and base could result in a neutral solution where this is desirable. Another example would include a blend of poly(lactic acid) and boric oxide. Other materials that undergo an irreversible degradation may also be suitable, if the products of the degradation do not undesirably interfere with either the conductivity of the proppant matrix or with the production of any of the fluids from the subterranean formation.

In choosing the appropriate degradable material, one should consider the degradation products that will result. These degradation products should not adversely affect other operations or components and may even be selected to improve the long-term performance and/or conductivity of the subterranean formation. The choice of degradable material also may depend, at least in part, on the conditions of the formation (e.g., temperature). For instance, lactides have been found to be suitable for lower temperature formations, including those within the range of 60° F. (15.6° C.) to 150° F. (65.6° C.), and polylactides have been found to be suitable for formation temperatures above this range. Also, poly (lactic acid) may be suitable for higher temperature formations. Some stereoisomers of poly(lactide) or mixtures of such stereoisomers may be suitable for even higher temperature applications.

Suitable micro-proppant particulates, macro-proppant particulates, and degradable macro-proppant particulates for use in conjunction with the embodiments described herein may be any known shape of material, including substantially spherical materials; fibrous materials; polygonal materials (e.g., cubic materials); and any combinations thereof. In some embodiments, the micro-proppant particulates may be present in the micro-proppant treatment fluid in an amount in the range of from a lower limit of about 0.01 pounds per gallon ("lb/gal"), 0.05 lb/gal, 0.1 lb/gal, 0.15 lb/gal, 0.2 lb/gal, 0.25 lb/gal, 0.3 lb/gal, 0.35 lb/gal, 0.4 lb/gal, 0.45 lb/gal, and 0.5 lb/gal to an upper limit of about 1 lb/gal, 0.95 lb/gal, 0.9 lb/gal, 0.85 lb/gal, 0.8 lb/gal, 0.75 lb/gal, 0.7 lb/gal, 0.65 lb/gal, 0.6 lb/gal, 0.55 lb/gal, and 0.5 lb/gal of the micro-proppant treatment fluid. In some embodiments, the macro-proppant particulates may be present in the macro-proppant treatment fluid in an amount in the range of from a lower limit of about 0.1 lb/gal, 0.3 lb/gal, 0.6 lb/gal, 0.9 lb/gal, 1.2 lb/gal, 1.5 lb/gal, 1.8 lb/gal, 2.1 lb/gal, 2.4 lb/gal, 2.7 lb/gal, and 3 lb/gal to an upper limit of about 6 lb/gal, 5.7 lb/gal, 5.4 lb/gal, 5.1 lb/gal, 4.8 lb/gal, 4.5 lb/gal, 4.2 lb/gal, 3.9 lb/gal, 3.6 lb/gal, 3.3 lb/gal, and 3 lb/gal of the macro-proppant treatment fluid. When degradable macro-proppant particulates are included in the macro-proppant treatment fluid, they may be present in an amount in the range of from a lower limit of about 0.1 lb/gal, 0.3 lb/gal, 0.6 lb/gal, 0.9 lb/gal, 1.2 lb/gal, 1.5 lb/gal, 1.8 lb/gal, 2.1 lb/gal, 2.4 lb/gal, 2.7 lb/gal, and 3 lb/gal to an upper limit of about 6 lb/gal, 5.7 lb/gal, 5.4 lb/gal, 5.1 lb/gal, 4.8 lb/gal, 4.5 lb/gal, 4.2 lb/gal, 3.9 lb/gal, 3.6 lb/gal, 3.3 lb/gal, and 3 lb/gal of the combined macro-proppant particulates and degradable macro-proppant particulates in the macro-proppant treatment fluid.

In various embodiments, systems configured for delivering the treatment fluids (i.e., pad fluid (including the first and second pad fluid), the fracturing fluid, and/or the jetting fluid) described herein to a downhole location are described. In various embodiments, the systems can comprise a pump fluidly coupled to a tubular, the tubular containing the treatment fluids described herein. It will be appreciated that while the system described below may be used for delivering either or both of the temporary sealant slurry and the fracturing fluid, each treatment fluid is delivered separately into the subterranean formation.

The pump may be a high pressure pump in some embodiments. As used herein, the term "high pressure pump" will refer to a pump that is capable of delivering a fluid downhole at a pressure of about 1000 psi or greater. A high pressure pump may be used when it is desired to introduce the treatment fluids to a subterranean formation at or above a fracture gradient of the subterranean formation, but it may also be used in cases where fracturing is not desired. In some embodiments, the high pressure pump may be capable of fluidly conveying particulate matter, such as the non-degradable particulates, the degradable particulates, and the proppant particulates described in some embodiments herein, into the subterranean formation. Suitable high pressure pumps will be known to one having ordinary skill in the art and may include, but are not limited to, floating piston pumps and positive displacement pumps.

In other embodiments, the pump may be a low pressure pump. As used herein, the term "low pressure pump" will refer to a pump that operates at a pressure of about 1000 psi or less. In some embodiments, a low pressure pump may be fluidly coupled to a high pressure pump that is fluidly coupled to the tubular. That is, in such embodiments, the low pressure pump may be configured to convey the treatment fluids to the high pressure pump. In such embodiments, the low pressure pump may "step up" the pressure of the treatment fluids before reaching the high pressure pump.

In some embodiments, the systems described herein can further comprise a mixing tank that is upstream of the pump and in which the treatment fluids are formulated. In various embodiments, the pump (e.g., a low pressure pump, a high pressure pump, or a combination thereof) may convey the treatment fluids from the mixing tank or other source of the treatment fluids to the tubular. In other embodiments, however, the treatment fluids may be formulated offsite and transported to a worksite, in which case the treatment fluid may be introduced to the tubular via the pump directly from its shipping container (e.g., a truck, a railcar, a barge, or the like) or from a transport pipeline. In either case, the treatment fluids may be drawn into the pump, elevated to an appropriate pressure, and then introduced into the tubular for delivery downhole.

FIG. 1 shows an illustrative schematic of a system that can deliver the treatment fluids of the present disclosure to a downhole location, according to one or more embodiments. It should be noted that while FIG. 1 generally depicts a land-based system, it is to be recognized that like systems may be operated in subsea locations as well. As depicted in FIG. 1, system 1 may include mixing tank 10, in which the treatment fluids of the embodiments herein may be formulated. The treatment fluids may be conveyed via line 12 to wellhead 14, where the treatment fluids enter tubular 16, tubular 16 extending from wellhead 14 into subterranean formation 18. Upon being ejected from tubular 16, the treatment fluids may subsequently penetrate into subterranean formation 18. Pump 20 may be configured to raise the pressure of the treatment fluids to a desired degree before introduction into tubular 16. It is to be recognized that system 1 is merely exemplary in nature and various additional components may be present that have not necessarily been depicted in FIG. 1 in the interest of clarity. Non-limiting additional components that may be present include, but are not limited to, supply hoppers, valves, condensers, adapters, joints, gauges, sensors, compressors, pressure controllers, pressure sensors, flow rate controllers, flow rate sensors, temperature sensors, and the like.

Although not depicted in FIG. 1, the treatment fluid may, in some embodiments, flow back to wellhead 14 and exit subterranean formation 18. In some embodiments, the treatment fluid that has flowed back to wellhead 14 may subsequently be recovered and recirculated to subterranean formation 18.

It is also to be recognized that the disclosed treatment fluids may also directly or indirectly affect the various downhole equipment and tools that may come into contact with the treatment fluids during operation. Such equipment and tools may include, but are not limited to, wellbore casing, wellbore liner, completion string, insert strings, drill string, coiled tubing, slickline, wireline, drill pipe, drill collars, mud motors, downhole motors and/or pumps, surface-mounted motors and/or pumps, centralizers, turbolizers, scratchers, floats (e.g., shoes, collars, valves, etc.), logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like. Any of these components may be included in the systems generally described above and depicted in FIG. 1.

Embodiments disclosed herein include:

A. A method comprising: (a) introducing a micro-proppant treatment fluid into a subterranean formation at a rate and pressure sufficient to create or enhance at least one fracture in a first treatment interval within the subterranean formation, wherein the micro-proppant treatment fluid comprises a first aqueous base fluid, micro-proppant particulates, and a first aqueous-based surface modification agent; (b) placing the micro-proppant particulates into the at least one fracture; (c) introducing a surface modification treatment fluid into the subterranean formation, wherein the surface modification treatment fluid comprises a second aqueous base fluid and a second aqueous-based surface modification agent; (d) coating at least a portion of a face of the at least one fracture with the second aqueous-based surface modification agent; (e) introducing a macro-proppant treatment fluid into the subterranean formation, wherein the macro-proppant treatment fluid comprises a third base fluid and macro-proppant particulates; and, (f) placing the macro-proppant particulates into the at least one fracture.

B. A method comprising: (a) introducing a micro-proppant treatment fluid into a subterranean formation at a rate and pressure sufficient to create or enhance at least one fracture in a first treatment interval within the subterranean formation, wherein the micro-proppant treatment fluid comprises a first aqueous base fluid and micro-proppant particulates coated with a first aqueous-based surface modification agent, thereby forming coated micro-proppant particulates; (b) placing the coated micro-proppant particulates into the at least one fracture; (c) introducing a surface modification treatment fluid into the subterranean formation, wherein the surface modification treatment fluid comprises a second aqueous base fluid and a second aqueous-based surface modification agent; (d) coating at least a portion of a face of the at least one fracture with the second aqueous-based surface modification agent; (e) introducing a macro-proppant treatment fluid into the subterranean formation, wherein the macro-proppant treatment fluid comprises a third aqueous base fluid and macro-proppant particulates; and (f) placing the macro-proppant particulates into the at least one fracture so as to form a proppant pack therein.

C. A method comprising: (a) introducing a micro-proppant treatment fluid into a subterranean formation at a rate and pressure sufficient to create or enhance at least one fracture in a first treatment interval within the subterranean formation, wherein the micro-proppant treatment fluid comprises a first aqueous base fluid and micro-proppant particulates coated with a first aqueous-based surface modification agent, thereby forming coated micro-proppant particulates; (b) placing the coated micro-proppant particulates into the at least one fracture; (c) introducing a surface modification treatment fluid into the subterranean formation, wherein the surface modification treatment fluid comprises a second aqueous base fluid and a second aqueous-based surface modification agent; (d) coating at least a portion of a face of the at least one fracture with the second aqueous-based surface modification agent; (e) introducing a macro-proppant treatment fluid into the subterranean formation, wherein the macro-proppant treatment fluid comprises a third aqueous base fluid, macro-proppant particulates, and degradable macro-proppant particulates; (f) placing the macro-proppant particulates and the degradable macro-proppant particulates into the at least one fracture; and (g) degrading the degradable macro-proppant particulates.

Each of embodiments A, B, and C may have one or more of the following additional elements in any combination:

Element 1: Wherein the first aqueous-based surface modification agent is present in the micro-proppant treatment fluid in an amount in the range of from about 0.01% to about 1% by volume of the micro-proppant treatment fluid.

Element 2: Wherein the second aqueous-based surface modification agent is present in the surface modification treatment fluid in an amount in the range of from about 2 to about 5 times the amount of the first aqueous-based surface modification agent present in the micro-proppant treatment fluid.

Element 3: Further comprising repeating steps (a) through (f) at a second treatment interval.

Element 4: Further comprising repeating steps (a) through (g) at at least a second treatment interval.

Element 5: Further comprising introducing the macro-proppant treatment fluid intermittently between a substantially solids-free fluid, so as to alternate the macro-proppant treatment fluid and the substantially solids-free fluid within the at least one fracture.

Element 6: Wherein the macro-proppant treatment fluid further comprises degradable macro-proppant particulates.

Element 7: Wherein the first and second aqueous-based surface modification agent are selected from the group consisting of a polyamide; a polyester; a polycarbonate; a polycarbamate; a curable resin; a zeta-potential reducing agent; and any combination thereof.

Element 8: Wherein at least one of the micro-proppant treatment fluid, the surface modification treatment fluid, and the macro-proppant treatment fluid further comprises and additive selected from the group consisting of a salt; a weighting agent; an inert solid; a fluid loss control agent; an emulsifier; a dispersion aid; a corrosion inhibitor; an emulsion thinner; an emulsion thickener; a gelling agent; a surfactant; a lost circulation material; a foaming agent; a gas; a pH control additive; a breaker; a biocide; a cross-linker; a chelating agent; a scale inhibitor; a gas hydrate inhibitor; an oxidizer; a reducer; a friction reducer; a clay stabilizing agent; and any combination thereof.

Element 9: Wherein at least one of the micro-proppant treatment fluid, the surface modification treatment fluid, and the macro-proppant treatment fluids is introduced into the subterranean formation using a pump.

By way of non-limiting example, exemplary combinations applicable to A, B, C include: A with 1 and 2; A with 3, 6, and 7; B with 1 and 2; B with 7 and 8; C with 1 and 2; C with 4, 5, and 8.

To facilitate a better understanding of the embodiments disclosed herein, the following examples of preferred or representative embodiments are given. In no way should the following examples be read to limit, or to define, the scope of the disclosure.

Example 1

In this example, the effectiveness of the ASMA in contact with either the micro-proppant particulates or the macro-proppant particulates ("one-stage treatment") and the effectiveness of coating the formation prior to introducing the macro-proppant particulates ("two-stage treatment") was evaluated using core flow testing, and compared to a treatment with the proppant particulates alone. Split aluminum cylinders (2.54 cm×5.08 cm (1 in×2 in)) were prepared by splitting the aluminum cylinder along its axial length into two halves.

In the one-stage treatments, the split aluminum cylinders were treated with a micro-proppant treatment fluid comprising 0.5% (v/v) of a polyamide ASMA, 2% (v/v) clay stabilizing agent, 5 pounds per 1000 gallons (lb/Mgal) gelling agent, and 0.1 pound mass per gallon (lbm/gal) of micro-proppant particulates selected from 325-mesh silica flour (d50=17.1 µm) or ceramic microspheres (d50=29.7 µm) or macro-proppant particulate of 100-mesh sand (d50=177 µm). Each faces of the split aluminum cylinders were immersed in the micro-proppant treatment fluid at 60° C. (140° F.) for 5 minutes. After the immersion period, the treated halves were reassembled for core flow testing with nitrogen gas. The confining pressure on the cylinder was gradually increased to 1,200 psi and the backpressure was set to 200 psi.

In the two-stage treatments, the split aluminum cylinders were treated with a surface modification treatment fluid comprising 5% (v/v/) of a polyamide ASMA. Each of the faces of the split aluminum cylinders was immersed in the surface modification treatment fluid at 60° C. (140° F.) for 10 minutes. After removal from the surface modification treatment fluid, the faces were immersed in a macro-proppant treatment fluid comprising 0.5 lbm/gal 100-mesh sand at 60° C. (140° F.) for 20 minutes. After the immersion period, the treated halves were reassembled for core flow testing with nitrogen gas. The confining pressure on the cylinders was gradually increased to 1,200 psi and the backpressure was set to 200 psi.

Table 1 shows the results. $K_i$ represents the initial permeability in mD of the split aluminum cylinders and $K_t$ represents the permeability in mD of the split aluminum cylinders after treatment. The symbol "-" indicates that the particular test was not performed.

As is evident from Table 1, the permeabilities of the aluminum cylinders were greatly enhanced with use of the ASMA, as compared to the cylinders treated with particulates only. Moreover, the two-stage treatment demonstrated substantially enhanced permeability. Such permeability increases may be a direct result of vertical distribution enhancement of the particulates and the partial monolayer of particulates formed within the split aluminum cylinder (simulating a fracture). The ASMA may provide a thin tacky film, or patches of a thin tacky film, distributed on the split core face, allowing the particulates or their clusters to adhere thereto, significantly increasing the permeability of the cylinder.

Upon visual inspection, the particulates were found adhered to the split aluminum cylinder face individually or in clusters, and distributed randomly throughout, demonstrating the ability of the ASMA treated cores to form partial monolayers of particulates.

TABLE 1

Effect of ASMA and Fine Particulates on Permeability of Split Aluminum Cylinder

| Particulate Type | Permeability of Particulates Only | | Treatment Type | Permeability of Particulates and ASMA | |
|---|---|---|---|---|---|
| | $K_i$ (mD) | $K_t$ (mD) | | $K_i$ (mD) | $K_t$ (mD) |
| 325-mesh silica flour | 0.94 | 2.4 | One-stage | 0.91 | 12 |
| Ceramic microspheres | 0.94 | 3.1 | One-stage | 0.45 | 60 |
| 100-mesh sand | 0.94 | 2.0 | One-stage | 0.94 | 1304 |
| 100-mesh sand | — | — | Two-stage | 4 | >3000 |

Example 2

In this example, the effectiveness of the ASMA in contact with either the micro-proppant particulates or the macro-proppant particulates ("one-stage treatment") and the effectiveness of coating the formation prior to introducing the macro-proppant particulates ("two-stage treatment") was evaluated using core flow testing, and compared to treatment with the proppant particulates alone. Split shale cores were (2.54 cm×5.08 cm (1 in×2 in)) were prepared by splitting the shale core along its axial length into two halves.

In the one-stage treatments, the split shale cores were treated with a micro-proppant treatment fluid comprising 0.5% (v/v) of a polyamide ASMA, 2% (v/v) clay stabilizing agent, 5 pounds per 1000 gallons (lb/Mgal) gelling agent, and 0.1 pound mass per gallon (lbm/gal) of micro-proppant particulates selected from 325-mesh silica flour (d50=17.1 µm) or ceramic microspheres (d50=29.7 µm) or macro-proppant particulate of 100-mesh sand (d50=177 µm). Each face of the split shale cores were immersed in the micro-proppant treatment fluid at 60° C. (140° F.) for 5 minutes. After the immersion period, the treated halves were reassembled for core flow testing with nitrogen gas. The confining pressure on the core was gradually increased to 1,200 psi and the backpressure was set to 200 psi.

In the two-stage treatments, the split shale cores were treated with a surface modification treatment fluid comprising 5% (v/v/) of a polyamide ASMA. Each of the faces of the split shale cores was immersed in the surface modification treatment fluid at 60° C. (140° F.) for 10 minutes. After removal from the surface modification treatment fluid, the faces were immersed in a macro-proppant treatment fluid comprising 0.5 lbm/gal 100-mesh sand at 60° C. (140° F.) for 20 minutes. After the immersion period, the treated halves were reassembled for core flow testing with nitrogen gas. The confining pressure on the cores was gradually increased to 1,200 psi and the backpressure was set to 200 psi.

Table 1 shows the results. $K_i$ represents the initial permeability in mD of the split core and $K_t$ represents the permeability in mD of the split core after treatment. The symbol "-" indicates that the particular test was not performed.

As is evident from Table 2, the permeabilities of the cores were greatly enhanced with use of the ASMA, as compared to the cores treated with particulates only. Such permeability increases may be a direct result of vertical distribution enhancement of the particulates and the partial monolayer of particulates formed within the split core (simulating a fracture). The ASMA may provide a thin tacky film, or patches of a thin tacky film, distributed on the split core face, allowing the particulates or their clusters to adhere thereto, significantly increasing the permeability of the core.

Upon visual inspection, the particulates were found adhered to the split core face individually or in clusters, and distributed randomly throughout the split core, demonstrating the ability of the ASMA treated cores to form partial monolayers of particulates.

TABLE 2

Effect of ASMA and Fine Particulates on Permeability of Split Shale Core

| Particulate Type | Permeability of Particulates Only | | Treatment Type | Permeability of Particulates and ASMA | |
|---|---|---|---|---|---|
| | $K_i$ (mD) | $K_r$ (mD) | | $K_i$ (mD) | $K_r$ (mD) |
| 325-mesh silica flour | — | — | One-stage | 7.9 | 18.1 |
| Ceramic microspheres | — | — | One-stage | 3.2 | 31.3 |
| 100-mesh sand | 2 | 17 | One-stage | 8.9 | 1832 |
| 100-mesh sand | 5 | 25 | Two-stage | 12 | 304 |
| 100-mesh sand | — | — | Two-stage | 14 | 1708 |

Therefore, the embodiments disclosed herein are well adapted to attain the ends and advantages mentioned as well as those that are inherent therein. The particular embodiments disclosed above are illustrative only, as they may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present disclosure. The embodiments illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces. If there is any conflict in the usages of a word or term in this specification and one or more patent or other documents that may be incorporated herein by reference, the definitions that are consistent with this specification should be adopted.

The invention claimed is:

1. A method comprising:
   (a) introducing a micro-proppant treatment fluid into a subterranean formation at a rate and pressure sufficient to create or enhance at least one fracture in a first treatment interval within the subterranean formation, wherein the micro-proppant treatment fluid comprises a first aqueous base fluid, micro-proppant particulates having a size in the range of about 1 μm to about 100 μm, and a first aqueous-based surface modification agent;
   (b) placing the micro-proppant particulates into the at least one fracture;
   (c) introducing a surface modification treatment fluid into the subterranean formation, wherein the surface modification treatment fluid comprises a second aqueous base fluid and a second aqueous-based surface modification agent;
   (d) coating at least a portion of a face of the at least one fracture with the second aqueous-based surface modification agent;
   (e) introducing a macro-proppant treatment fluid into the subterranean formation intermittently between a substantially solids-free fluid, so as to alternate the macro-proppant treatment fluid and the substantially solids-free fluid within the at least one fracture to form separate islands or pillars with void space therebetween, wherein the macro-proppant treatment fluid comprises a third base fluid and macro-proppant particulates having a size in the range of about 150 μm to about 2500 μm; and,
   (f) placing the macro-proppant particulates into the at least one fracture,
   wherein the first aqueous-based surface modification agent is present in the micro-proppant treatment fluid in an amount in the range of from about 0.01% to about 1% by volume of the micro-proppant treatment fluid, and
   wherein the second aqueous-based surface modification agent is present in the surface modification treatment fluid in an amount in the range of from about 2 to about 5 times the amount of the first aqueous-based surface modification agent present in the micro-proppant treatment fluid.

2. The method of claim 1, further comprising repeating steps (a) through (f) at a second treatment interval.

3. The method of claim 1, wherein the macro-proppant treatment fluid further comprises degradable macro-proppant particulates.

4. The method of claim 1, wherein the first and second aqueous-based surface modification agent are selected from the group consisting of a polyamide; a polyester; a polycarbonate; a polycarbamate; a curable resin; a zeta-potential reducing agent; and any combination thereof.

5. The method of claim 1, wherein at least one of the micro-proppant treatment fluid, the surface modification treatment fluid, and the macro-proppant treatment fluids is introduced into the subterranean formation using a pump.

6. The method of claim 1, wherein the micro-proppant particulates are present in the amount in the range of 0.01 lb/gal to 1.0 lb/gal.

7. The method of claim 1, wherein the macro-proppant particulates are present in an amount in a range of 0.1 lb/gal to 6.0 lb/gal.

8. A method comprising:
   (a) introducing a micro-proppant treatment fluid into a subterranean formation at a rate and pressure sufficient to create or enhance at least one fracture in a first treatment interval within the subterranean formation, wherein the micro-proppant treatment fluid comprises a first aqueous base fluid and micro-proppant particulates having a size in the range of about 1 µm to about 100 µm coated with a first aqueous-based surface modification agent, thereby forming coated micro-proppant particulates;

(b) placing the coated micro-proppant particulates into the at least one fracture;

(c) introducing a surface modification treatment fluid into the subterranean formation, wherein the surface modification treatment fluid comprises a second aqueous base fluid and a second aqueous-based surface modification agent;

(d) coating at least a portion of a face of the at least one fracture with the second aqueous-based surface modification agent;

(e) introducing a macro-proppant treatment fluid into the subterranean formation intermittently between a substantially solids-free fluid, so as to alternate the macro-proppant treatment fluid and the substantially solids-free fluid within the at least one fracture to form separate islands or pillars with void space therebetween, wherein the macro-proppant treatment fluid comprises a third aqueous base fluid and macro-proppant particulates having a size in the range of about 150 µm to about 2500 µm; and (f) placing the macro-proppant particulates into the at least one fracture so as to form a proppant pack therein,
wherein the first aqueous-based surface modification agent is present in the micro-proppant treatment fluid in an amount in the range of from about 0.01% to about 1% by volume of the micro-proppant treatment fluid, and
wherein the second aqueous-based surface modification agent is present in the surface modification treatment fluid in an amount in the range of from about 2 to about 5 times the amount of the first aqueous-based surface modification agent present in the micro-proppant treatment fluid.

9. The method of claim 8, further comprising repeating steps (a) through (f) at at least a second treatment interval.

10. The method of claim 8, wherein the first and second aqueous-based surface modification agent are selected from the group consisting of a polyamide; a polyester; a polycarbonate; a polycarbamate; a curable resin; a zeta-potential reducing agent; and any combination thereof.

11. The method of claim 8, wherein at least one of the micro-proppant treatment fluid, the surface modification treatment fluid, and the macro-proppant treatment fluids is introduced into the subterranean formation using a pump.

12. The method of claim 8, wherein the micro-proppant particulates are present in the amount in the range of 0.1 lb/gal to 1.0 lb/gal.

13. The method of claim 3, wherein the degradable macro-proppant particulates are present in an amount in the range of about 0.1 lb/gal to about 6.0 lb/gal.

14. A method comprising:
(a) introducing a micro-proppant treatment fluid into a subterranean formation at a rate and pressure sufficient to create or enhance at least one fracture in a first treatment interval within the subterranean formation, wherein the micro-proppant treatment fluid comprises a first aqueous base fluid and micro-proppant particulates having a size in the range of about 1 µm to about 100 µm coated with a first aqueous-based surface modification agent, thereby forming coated micro-proppant particulates;

(b) placing the coated micro-proppant particulates into the at least one fracture;

(c) introducing a surface modification treatment fluid into the subterranean formation, wherein the surface modification treatment fluid comprises a second aqueous base fluid and a second aqueous-based surface modification agent;

(d) coating at least a portion of a face of the at least one fracture with the second aqueous-based surface modification agent;

(e) introducing a macro-proppant treatment fluid into the subterranean formation intermittently between a substantially solids-free fluid, so as to alternate the macro-proppant treatment fluid and the substantially solids-free fluid within the at least one fracture for forming separate islands or pillars with void space therebetween, wherein the macro-proppant treatment fluid comprises a third aqueous base fluid, macro-proppant particulates having a size in the range of about 150 µm to about 2500 µm, and degradable macro-proppant particulates;

(f) placing the macro-proppant particulates and the degradable macro-proppant particulates into the at least one fracture; and (g) degrading the degradable macro-proppant particulates,
wherein the first aqueous-based surface modification agent is present in the micro-proppant treatment fluid in an amount in the range of from about 0.01% to about 1% by volume of the micro-proppant treatment fluid, and
wherein the second aqueous-based surface modification agent is present in the surface modification treatment fluid in an amount in the range of from about 2 to about 5 times the amount of the first aqueous-based surface modification agent present in the micro-proppant treatment fluid.

15. The method of claim 14, further comprising repeating steps (a) through (g) at at least a second treatment interval.

16. The method of claim 14, wherein the first and second aqueous-based surface modification agent are selected from the group consisting of a polyamide; a polyester; a polycarbonate; a polycarbamate; a curable resin; a zeta-potential reducing agent; and any combination thereof.

17. The method of claim 14, wherein at least one of the micro-proppant treatment fluid, the surface modification treatment fluid, and the macro-proppant treatment fluids is introduced into the subterranean formation using a pump.

18. The method of claim 14, wherein the macro-proppant particulates are present in an amount in a range of 0.1 lb/gal to 6.0 lb/gal.

19. The method of claim 14, wherein the micro-proppant particulates are present in the amount in the range of 0.1 lb/gal to 1.0 lb/gal.

* * * * *